(12) United States Patent
Katou et al.

(10) Patent No.: US 10,493,627 B2
(45) Date of Patent: Dec. 3, 2019

(54) WORKPIECE PICKING SYSTEM

(71) Applicant: Fanuc Corporation, Yamanashi (JP)

(72) Inventors: Yoshiaki Katou, Yamanashi (JP); Tetsuji Ueda, Yamanashi (JP)

(73) Assignee: Fanuc Corporation, Yamanashi (JP)

( * ) Notice: Subject to any disclaimer, the term of this patent is extended or adjusted under 35 U.S.C. 154(b) by 203 days.

(21) Appl. No.: 15/686,866

(22) Filed: Aug. 25, 2017

(65) Prior Publication Data

US 2018/0056514 A1 Mar. 1, 2018

(30) Foreign Application Priority Data

Aug. 29, 2016 (JP) .................................. 2016-166437

(51) Int. Cl.
*B25J 9/00* (2006.01)
*B25J 9/16* (2006.01)

(52) U.S. Cl.
CPC ........... *B25J 9/1682* (2013.01); *B25J 9/0018* (2013.01); *B25J 9/0093* (2013.01); *G05B 2219/31274* (2013.01); *G05B 2219/39102* (2013.01)

(58) Field of Classification Search
USPC ................................................. 700/245–264
See application file for complete search history.

(56) References Cited

U.S. PATENT DOCUMENTS

| 5,040,056 | A | * | 8/1991 | Sager | ..................... | B25J 9/0093 |
| | | | | | | 348/88 |
| 5,305,892 | A | * | 4/1994 | Kronseder | ............... | B07C 5/36 |
| | | | | | | 209/523 |
| 8,145,350 | B2 | * | 3/2012 | Lancaster, III | ........ | B65G 61/00 |
| | | | | | | 414/791.8 |

(Continued)

FOREIGN PATENT DOCUMENTS

| EP | 1748339 A2 | 1/2007 |
| EP | 2537645 A1 | 12/2012 |

(Continued)

OTHER PUBLICATIONS

Japan Patent Office, Office Action dated Oct. 9, 2018 for Japan Patent Application No. 2016-166437.

(Continued)

*Primary Examiner* — Jonathan L Sample
(74) *Attorney, Agent, or Firm* — Winstead PC

(57) ABSTRACT

A workpiece picking system is provided, including: a conveyor that transfers multiple workpieces in one transfer direction; a position detection unit that detects transfer positions of the workpieces transferred by the conveyor; a distributing robot that sorts the workpieces transferred by the conveyor in a single row into two rows by a predetermined rule following the movement of the conveyor by performing line tracking based on the detected transfer positions; and a pair of picking robots that pick-up the workpieces, following the movement of the conveyor by performing line tracking based on the transfer positions (Continued)

detected by the position detection unit, and disposing only the workpieces in one of the rows sorted by the distributing robot, in an operating range of the picking robots. The pair of picking robots are arranged in a direction orthogonal to the transfer direction of the conveyor.

4 Claims, 5 Drawing Sheets

(56) References Cited

U.S. PATENT DOCUMENTS

| | | | | |
|---|---|---|---|---|
| 8,612,050 B2* | 12/2013 | Lee | ........................ | B65B 35/44 198/411 |
| 8,639,382 B1* | 1/2014 | Clark | ................... | G06Q 10/087 700/214 |
| 8,688,264 B2* | 4/2014 | Nignon | ..................... | B07C 5/28 700/223 |
| 8,718,814 B1* | 5/2014 | Clark | ................... | G06Q 10/08 700/214 |
| 9,346,630 B2* | 5/2016 | Nishizaka | .............. | B25J 9/0093 |
| 9,656,301 B2* | 5/2017 | Johnston | ................... | B07C 5/36 |
| 9,751,693 B1* | 9/2017 | Battles | ................ | G06Q 10/087 |
| 2002/0134710 A1* | 9/2002 | Nagler | ...................... | B07C 5/38 209/509 |
| 2005/0247607 A1* | 11/2005 | Knobel | ................. | B25J 9/0093 209/656 |
| 2007/0179671 A1 | 8/2007 | Arimatsu et al. | | |
| 2007/0208455 A1* | 9/2007 | Bollegraaf | ............... | B07C 5/36 700/223 |
| 2008/0121569 A1* | 5/2008 | Ottmann | ................ | B07C 5/122 209/522 |
| 2011/0202164 A1* | 8/2011 | Weber | .................... | B25J 9/0084 700/112 |
| 2011/0235054 A1* | 9/2011 | Koike | .................... | B25J 9/1697 356/620 |
| 2011/0243707 A1* | 10/2011 | Dumas | .................... | B65B 5/105 414/806 |
| 2012/0323363 A1* | 12/2012 | Izumi | ..................... | B25J 9/1697 700/248 |
| 2013/0017052 A1* | 1/2013 | Dorner | ................... | B25J 9/0018 414/794.4 |
| 2013/0329954 A1* | 12/2013 | Ikeda | ..................... | G06T 1/0007 382/103 |
| 2014/0046471 A1* | 2/2014 | Bamford | .............. | G05B 19/048 700/110 |
| 2014/0172165 A1* | 6/2014 | Oda | .................... | G05B 19/4182 700/248 |
| 2016/0056695 A1* | 2/2016 | Santandrea | ............ | H02K 15/08 29/732 |
| 2016/0199884 A1* | 7/2016 | Lykkegaard | .............. | B07C 5/02 700/223 |
| 2017/0015005 A1* | 1/2017 | Joplin | ................. | G06F 19/3462 |
| 2017/0066597 A1* | 3/2017 | Hiroi | ...................... | B65G 1/137 |
| 2018/0036774 A1* | 2/2018 | Lukka | ..................... | B25J 9/163 |

FOREIGN PATENT DOCUMENTS

| | | |
|---|---|---|
| EP | 2586575 A1 | 5/2013 |
| EP | 2586576 A1 | 5/2013 |
| EP | 2653414 A1 | 10/2013 |
| JP | H04-226221 A | 8/1992 |
| JP | H08-039468 A | 2/1996 |
| JP | H08-091550 A | 4/1996 |
| JP | 2001-199527 A | 7/2001 |
| JP | 2002-265039 A | 9/2002 |
| JP | 2007030087 A | 2/2007 |
| JP | 2010-006590 A | 1/2010 |
| JP | 2012-166308 A | 9/2012 |
| JP | 2013-860 A | 1/2013 |
| JP | 2014-58334 A | 4/2014 |
| JP | 2014-117758 A | 6/2014 |
| KR | 10-1510075 B1 | 4/2015 |

OTHER PUBLICATIONS

Japan Patent Office, Search Report dated Sep. 27, 2018 for Japan Patent Application No. 2016-166437.

* cited by examiner

WORKPIECE PICKING SYSTEM

CROSS-REFERENCE TO RELATED APPLICATIONS

This application is based on and claims priority to Japanese Patent Application No. 2016-166374 filed on Aug. 29, 2016, the entire content of which is incorporated herein by reference.

TECHNICAL FIELD

The present invention relates to a workpiece picking system.

BACKGROUND ART

With conventional techniques, in order to pick workpieces transferred in a single row by a conveyor, and to transfer the workpieces to multiple picking destinations according to a predetermined rule, a workpiece picking system is known, wherein multiple picking robots are installed at intervals in the workpiece transfer direction of the conveyor to pick-up and convey the workpieces arranged on the conveyor to the picking destinations by performing line tracking that makes each robot to follow the movement of the conveyor (see PTL 1, for example).

CITATION LIST

Patent Literature

{PTL 1}
Japanese Unexamined Patent Application, Publication No. 2007-30087

SUMMARY OF INVENTION

One of the aspects of the present invention is a workpiece picking system including: a conveyor that transfers a plurality of workpieces in one transfer direction, a position detection unit that detects transfer positions of the workpieces transferred by the conveyor; a distributing robot that sorts the workpieces transferred by the conveyor in a single row into two rows by a predetermined rule, following movement of the conveyor by performing line tracking based on the transfer positions detected by the position detection unit; and a pair of picking robots that pick-up the workpieces, following the movement of the conveyor by performing line tracking based on the transfer positions detected by the position detection unit, and only the workpieces in a corresponding one of the rows sorted by the distributing robot are disposed in an operating range of each of the picking robots, wherein the pair of picking robots are arranged in a direction orthogonal to the transfer direction of the conveyor.

DESCRIPTION OF EMBODIMENTS

A workpiece picking system 1 according to an embodiment of the present invention will be described below with reference to the drawings.

Figure 1:
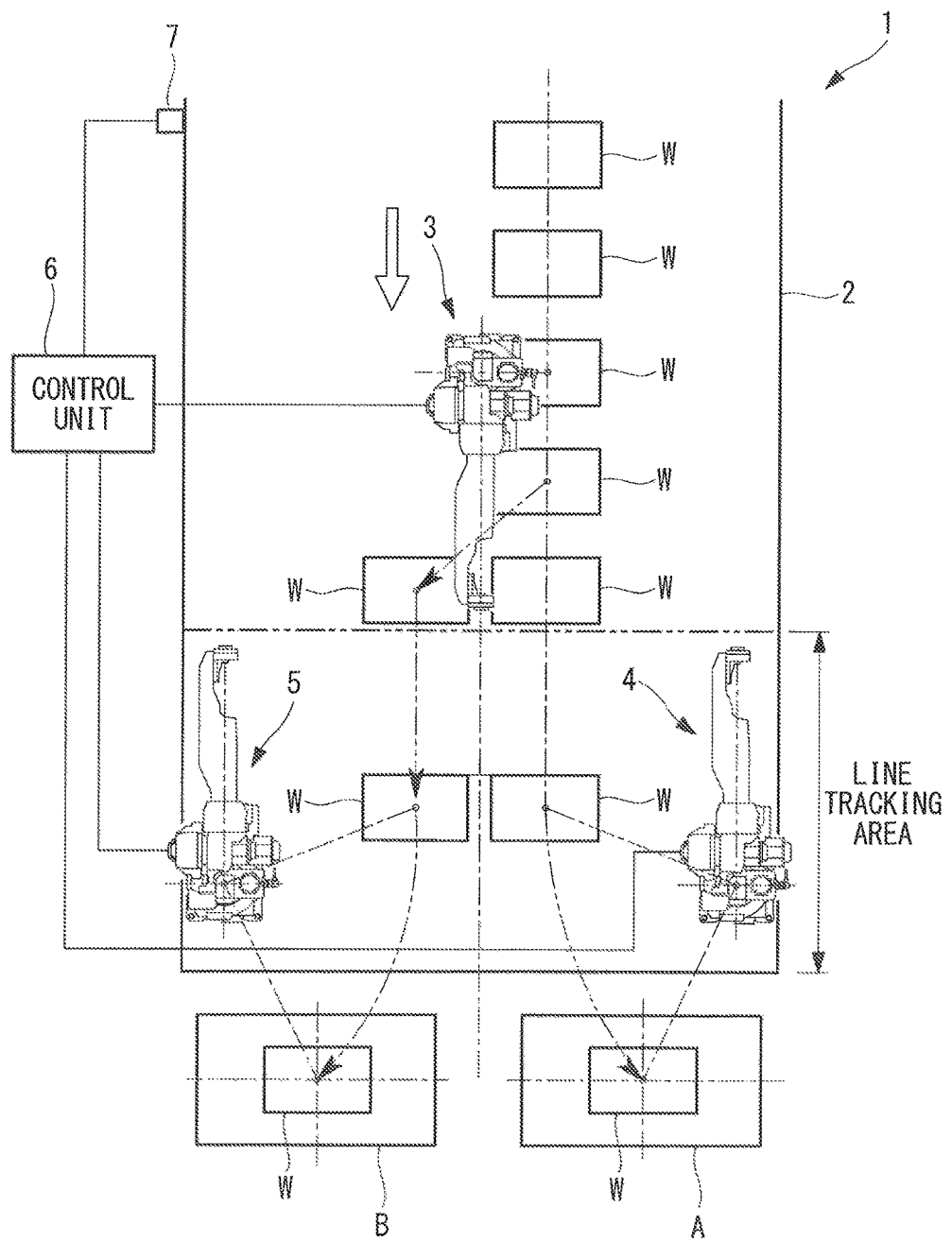
FIG. 1 is a plan view showing a workpiece picking system according to an embodiment of the present invention.

As shown in FIG. 1, the workpiece picking system 1 according to the present embodiment includes a conveyor 2 that transfers workpieces W in one direction, a distributing robot 3 that divides the multiple workpieces W transferred by the conveyor 2 in a single row into two rows of workpieces W, a pair of picking robots 4 and 5 arranged on the downstream side of the distributing robot 3, and a control unit 6 that controls the robots 3, 4, and 5.

The distributing robot 3 and the pair of picking robots 4 and 5 are a ceiling suspended six-axis articulated robots installed above the conveyor 2, each robot includes an unshown hand at an end of an arm for holding a workpiece W.

The distributing robot 3 is arranged at a substantially central region in the width direction (direction orthogonal to the transfer direction) of the conveyor 2. Furthermore, the pair of picking robots 4 and 5 are arranged side-by-side in the width direction of the conveyor 2.

The distributing robot 3 and the pair of picking robots 4 and 5 are set at respective installation positions such that the operation range including the workpiece W of the distributing robot 3, holding the workpiece W by the hand, and the operation range including the workpiece W of the picking robots 4 and 5, each holding the workpiece W by the hand do not overlap each other.

The conveyor 2 is provided with an encoder (position detection unit) 7 for detecting the stroke of the conveyor 2. By loading each workpiece W to the conveyor 2 at a predetermined timing, it is possible to detect the transfer positions of the workpieces W only by the travel distance of the conveyor 2 detected by the encoder 7.

Based on the information on the transfer positions of the workpieces W detected by the encoder 7, the control unit 6 performs line tracking to make the distributing robot 3 and the pair of picking robots 4 and 5 to follow movement of the workpieces W transferred by the conveyor 2.

As a result, This makes it possible for the distributing robot 3 and the picking robots 4 and 5 to hold, sort, and pick-up the workpiece W by the hand following the movement of the workpiece W transferred by the conveyor 2.

As shown in FIG. 1, the pair of picking robots 4 and 5 are configured to transfer the workpieces W picked from the conveyor 2 to the picking destinations A and B arranged further downstream of the downstream end of the conveyor 2.

With such an arrangement, the conveyor 2 is configured to transfer the workpieces W in a single row, and the distributing robot 3 is configured to sort a single row of workpieces W into two rows of workpieces W according to a predetermined rule. The predetermined rule may be defined as desired, and predetermined conditions such as the type, weight, size, or the like, of the workpieces W may be employed.

The operation of the workpiece picking system 1 having such a configuration according to the present embodiment will be described below with reference to the drawings.

In order to classify the workpieces W transferred by the conveyor 2 into two groups using the workpiece picking system 1 according to the present embodiment, the conveyor 2 transfers in a single row, a plurality of the workpieces W that are arranged within the operation range of one of the picking robots 4 and that are arranged outside the operation range of the other picking robot 5, in a straight line extending along the transfer direction of the conveyor 2.

First, the workpieces W pass through the operation range of the distributing robot 3 arranged on the upstream side. Based on the information on the transfer positions sent from the encoder 7 of the conveyor 2 and the information defined by the predetermined rules, the control unit 6 performs line tracking to make the distribution robot 3 follow the movement of the conveyor 2, to hold only the workpieces W that conform to the aforementioned predetermined rules. The workpieces W which do not match the aforementioned predetermined rules are continued to be transferred by the conveyor 2.

Subsequently, the control unit 6 causes the distributing robot 3 to handle the workpieces W held by the distributing robot 3, so as to change the transfer path of the workpieces W by the conveyor 2, such that the workpieces W pass through, from the operation range of one of the picking robots 4 to the operation range of the other picking robot 5. As a result, the workpieces W transferred in a single row are rearranged into two rows.

At this stage, the distributing robot 3, for example, changes the positions of each workpiece W on the conveyor 2 in the width direction only, and the positions of the workpieces W in the transfer direction are moved by line tracking so as to match the original transfer direction positions.

This makes it possible for the pair of picking robots 4 and 5 to hold and transfer the workpieces W transferred within each operation range by line tracking of the control unit 6 to the picking destinations, based on the information on the transfer positions as they are transferred by the conveyor 2.

Figure 2:
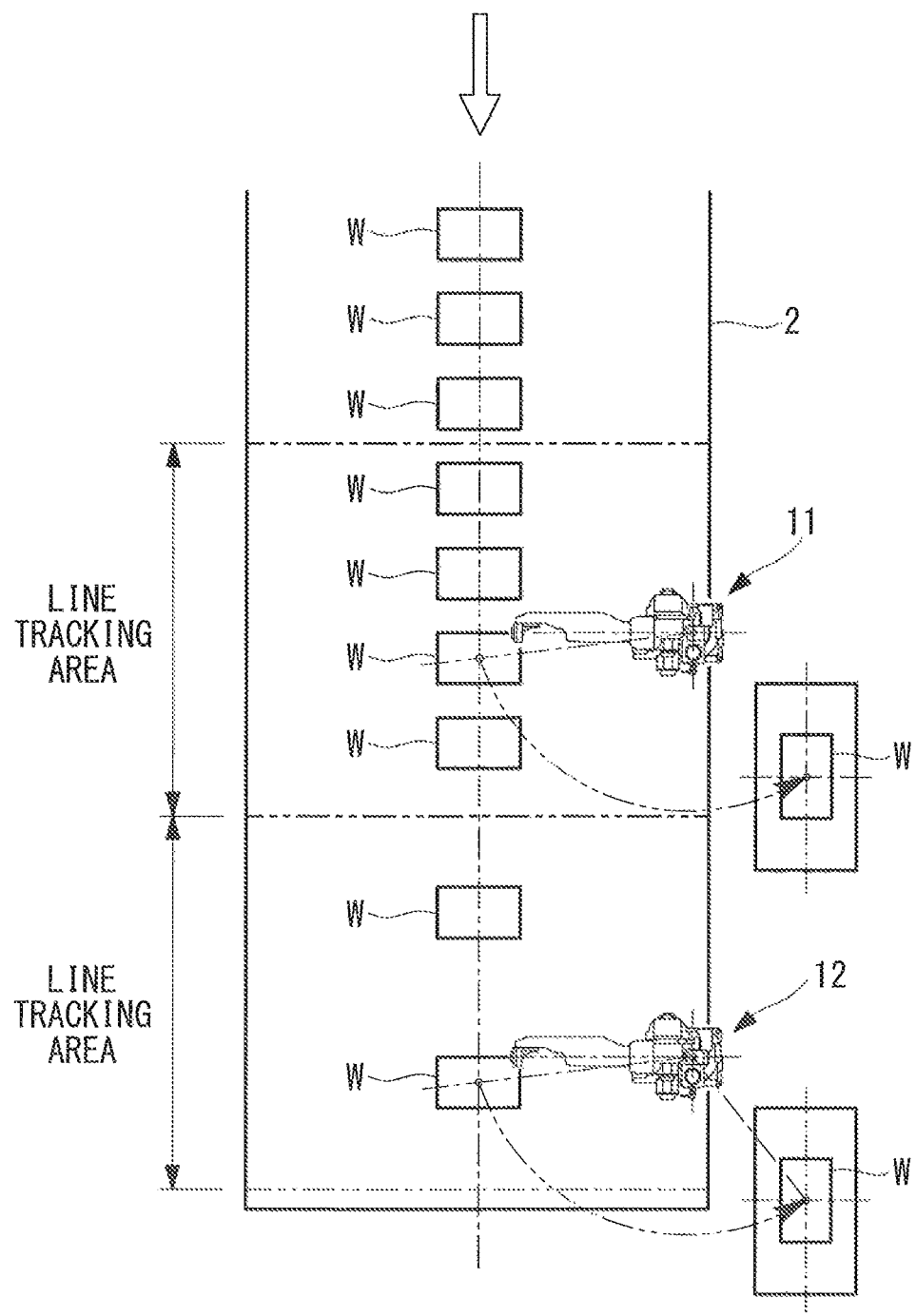
FIG. 2 is a plan view showing an example of conventional systems as a comparative example of the workpiece picking system shown in FIG. 1.
Figure 3:
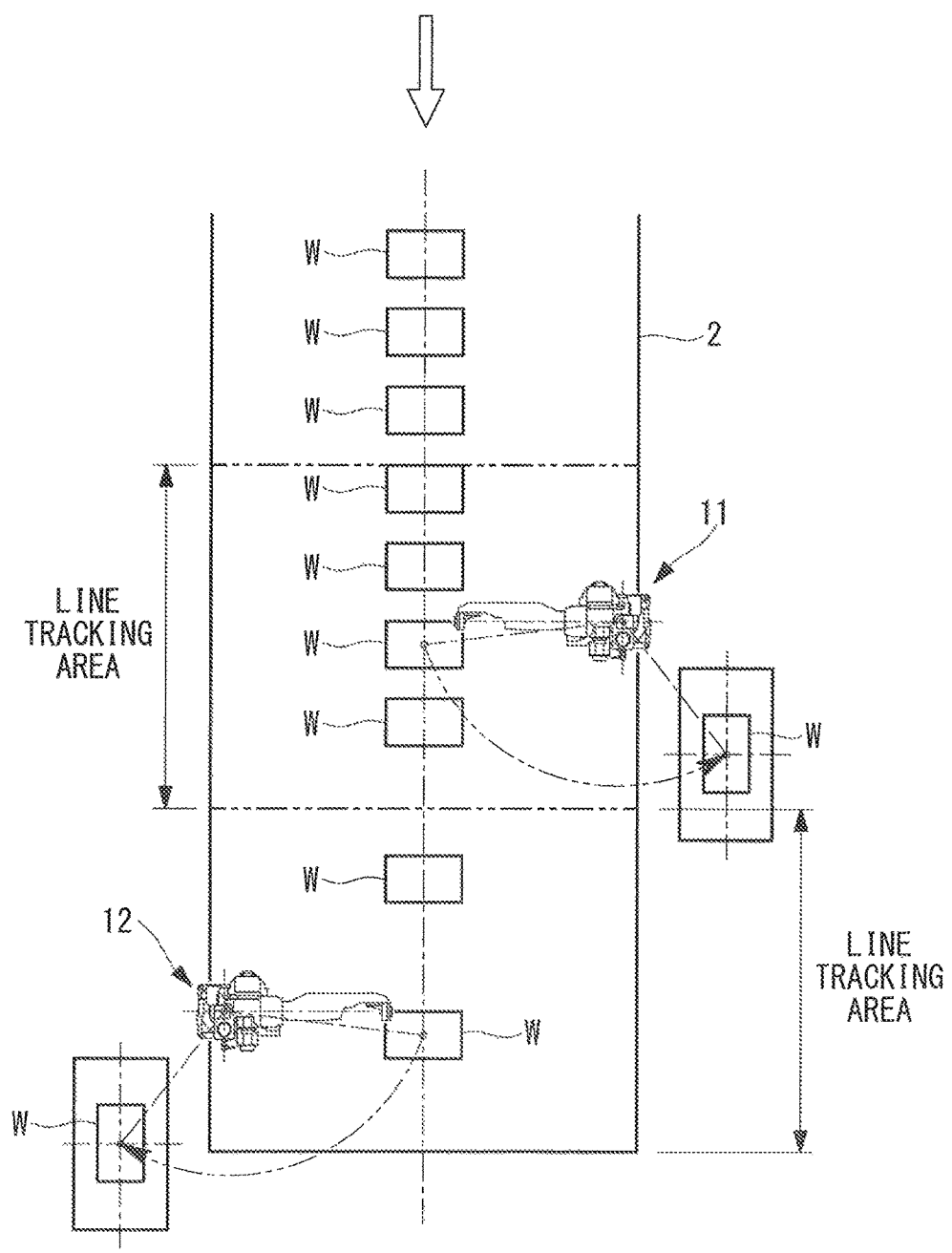
FIG. 3 is a plan view showing another example of conventional systems as a comparative example of the workpiece picking system shown in FIG. 1.

As described above, according to the workpiece picking system 1 of the present embodiment, there is no need to arrange such two picking robots 4 and 5 along the transfer direction of the conveyor 2, and the line tracking area defined along the transfer direction of the conveyor 2 is shared by the two picking robots 4 and 5, thereby providing an advantage of allowing the line length to be reduced. That is to say, as shown in FIG. 2 or 3, according to the conventional methods in which picking robots 11 and 12 are arranged side-by-side along the workpiece W transfer direction of the conveyor 2, in order to prevent the cycle time loss due to interlocking, it was necessary to install the picking robots 11 and 12 away from each other in the workpiece W transfer direction of the conveyor 2 so that the line tracking areas of the two picking robots 11 and 12 do not overlap each other, which lead to an increase in the line length.

In contrast, according to the workpiece picking system 1 of the present embodiment, by dividing the workpiece transfer path, the operation ranges of the two picking robots 4 and 5 are not overlapping so that the cycle time loss due to interlocking is prevented, and it is possible for the picking robots 4 and 5 to be installed approximately at the same position in the workpiece W transfer direction of the conveyor 2, thereby allowing the line length to be reduced. Furthermore, since the picking destinations of the workpieces W by the picking robots 4 and 5 are arranged at positions further down from the downstream end of the conveyor 2, this also provides another advantage of allowing the line width to be reduced.

Moreover, since the robots 3, 4, and 5 are each installed above the conveyor 2 such that they are ceiling suspended type, it is possible to effectively utilize the space above the conveyor 2 having a width that can transfer two rows of workpieces W, and thus, it is possible to further suppress an increase in the line width.

It should be noted that, in the present embodiment, the workpieces W are transferred on the conveyor 2 in a single row so as to pass through the operation range of one picking robot 4, and not to pass through the operation range of the other picking robot 5. Thereby, the distributing robot 3 needs to perform a handling operation only for the workpieces W picked by the other picking robot 5. This makes it possible for the workpieces W to be transferred at a higher speed.

Figure 4:
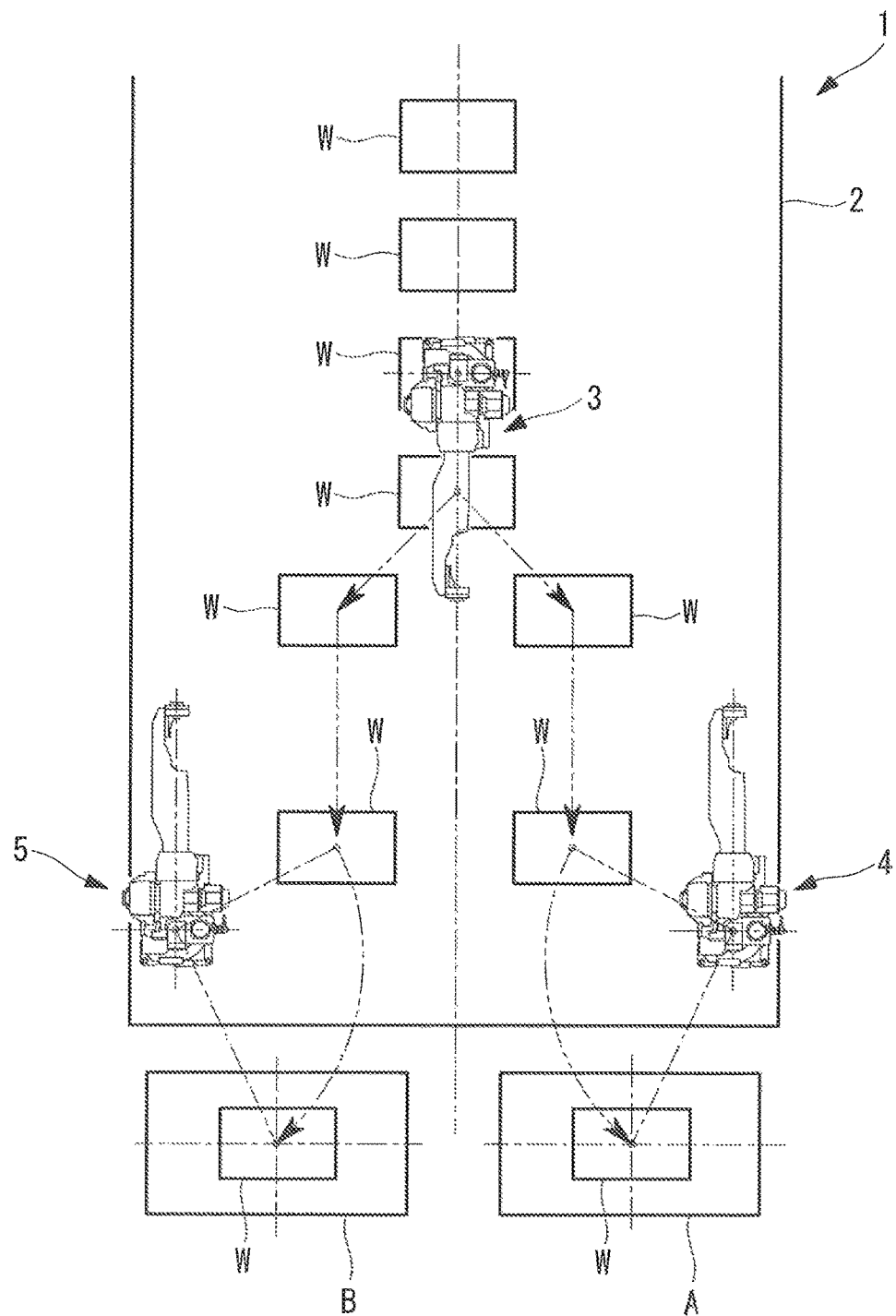
FIG. 4 is a plan view showing a first modification of the workpiece picking system shown in FIG. 1.

Alternatively, as shown in FIG. 4, the workpieces W may be transferred in a single row such that they pass through the approximate center in the width direction of the conveyor 2, and the distributing robot 3 may be configured to handle and distribute the workpieces W so that the workpieces W pass through the respective operation ranges of the two picking robots 4 and 5.

Figure 5:
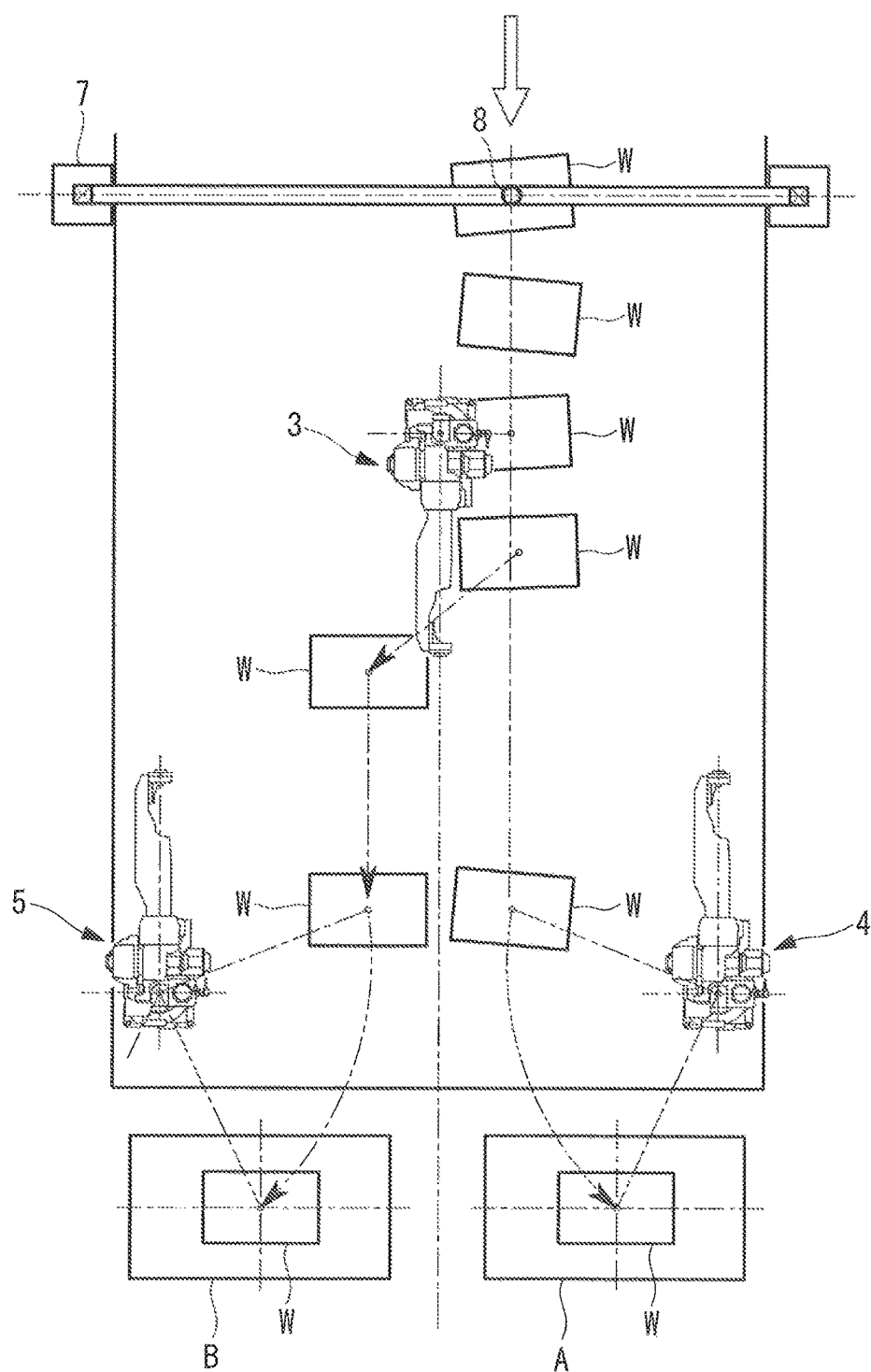
FIG. 5 is a plan view showing a second modification of the workpiece picking system shown in FIG. 1.

Further, as shown in FIG. 5, a camera 8 for capturing the workpieces W transferred by the conveyor 2 may be arranged above the conveyor 2 on the upstream side of the distributing robot 3. Also, the control unit 6 may control the robots 3, 4, and 5 by performing visual tracking based on an image captured by the camera 8 and the information on the transfer positions of each workpiece W detected by the encoder 7 of the conveyor 2.

As shown in FIG. 5, this makes it possible for the each robot 3, 4, and 5 to hold and perform handling of the workpieces W even if the workpieces W are transferred in a non-aligned state in various orientations. In particular, with respect to the workpiece W handled by the distributing robot 3, it is possible to align the workpieces W in orientations that can be easily picked by the picking robots 4 and 5 arranged at the latter stage. There is an advantage that this makes it possible for the picking robots 4 and 5 to pick the workpieces W with high efficiency without involving unnecessary operations.

Further, the description has been made in the present embodiment regarding an example including a pair of picking robots 4 and 5. Alternatively, the present invention is applicable to other workpiece picking systems including three or more picking robots. Furthermore, the description has been made in the present embodiment in which the distributing robot 3 and the pair of picking robots 4 and 5 are ceiling suspended six-axis articulated type robots. However, the present invention is not limited to such an example. For example, the robots 3, 4, and 5 may each be mounted on an overhung robot mount in a floor-mounted manner or a rack-mounted manner. Also, each of the robots 3, 4, and 5 may be a multi-axis articulated type robot other than the six-axis articulated type robot such as a five-axis or seven-axis articulated type robot.

From the above-described embodiments, the following aspects of the present invention are derived.

An aspect of the present invention is a workpiece picking system including: a conveyor that transfers a plurality of workpieces in one transfer direction, a position detection unit that detects transfer positions of the workpieces transferred by the conveyor; a distributing robot that sorts the workpieces transferred by the conveyor in a single row into two rows by a predetermined rule, following movement of the conveyor by performing line tracking based on the transfer positions detected by the position detection unit; and a pair of picking robots that pick-up the workpieces, following the movement of the conveyor by performing line tracking based on the transfer positions detected by the position detection unit, and only the workpieces in a corresponding one of the rows sorted by the distributing robot are disposed in an operating range of each of the picking robots, wherein the pair of picking robots are arranged in a direction orthogonal to the transfer direction of the conveyor.

According to this aspect, when the workpieces are transferred in a single row by the conveyor, the distributing robot arranged on the upstream side sorts the workpieces into two rows of workpieces. Since the pair of the picking robots arranged on the downstream side are arranged in a direction orthogonal to the transfer direction of the conveyor, the line length can be kept short.

In this case, since the pair of picking robots each define only one or the other from the two rows of the workpieces in their operation ranges, there is no need to provide an interlocking mechanism, thereby making it possible for each picking robot to perform a high-efficiency operation without involving cycle time loss.

In the aforementioned aspect, the distributing robot and the picking robots may be installed in a state in which they are suspended above the conveyor.

This makes it possible to effectively utilize the space above the conveyor having a large width that can transfer two rows of workpieces, thereby suppressing an increase in the line width.

Also, in the aforementioned aspect, the workpiece picking system may be provided with a camera arranged at an upstream side of the distributing robot, for capturing an image of the workpieces, and the distributing robot and the picking robots may perform the line tracking based on the transfer positions detected by the position detection unit and the image of the workpieces captured by the camera.

This makes it possible to correct the operations of the distributing robot and the picking robots to follow the positions of the workpieces based on the image of the workpieces captured by the camera even if the workpieces transferred in a single row are not aligned on the conveyor, and makes it handle each workpiece in a reliable manner.

Also, in the aforementioned aspect, the distributing robot may classify the workpieces transferred in a single row by the conveyor into two groups of workpieces, and may move only the workpieces belonging to one of the two groups to rearrange the workpieces into the two rows.

This makes it possible to reduce the number of workpieces handled by the distributing robot, thus, improving the transfer speed of the conveyor, and allowing the workpieces to be picked with higher efficiency.

According to the aforementioned aspects, it is possible to suppress an increase in the line length, and save space, even if the number of picking destinations of the workpieces transferred in a single row on the conveyor increases.

According to the present invention, it is possible to suppress an increase in the line length, and save space, even if the number of picking destinations of the workpieces transferred in a single row on the conveyor increases.

REFERENCE SIGNS LIST

1 Workpiece picking system
2 Conveyor
3 Distributing robot
4, 5 Picking robot
7 Encoder (Position detection unit)
8 Camera
W Workpiece

The invention claimed is:

1. A workpiece picking system comprising:
   a conveyor that transfers a plurality of workpieces in one transfer direction;
   a position detection unit that detects transfer positions of the workpieces transferred by the conveyor;
   a distributing robot which picks part of the workpieces that are aligned in a single row and that are being transferred by the conveyor and which puts picked workpieces on the conveyor, and thereby sorts the workpieces in the single row into two rows by a predetermined rule, tracking movement of the conveyor by performing line tracking based on the transfer positions detected by the position detection unit;
   a pair of picking robots that pick-up the workpieces, following the movement of the conveyor by performing line tracking based on the transfer positions detected by the position detection unit, and only the workpieces in a corresponding one of the rows sorted by the distributing robot are disposed in an operating range of each of the picking robots; and
   wherein the pair of picking robots are arranged in a direction orthogonal to the transfer direction of the conveyor.

2. The workpiece picking system according to claim 1, wherein the distributing robot and the picking robots are installed in a state in which they are suspended above the conveyor.

3. The workpiece picking system according to claim 1, further comprising:
   a camera arranged at an upstream side of the distributing robot, for capturing an image of the workpieces; and
   wherein the distributing robot and the picking robots each perform the line tracking based on the transfer positions detected by the position detection unit and the image of the workpieces captured by the camera.

4. The workpiece picking system according to claim 1, wherein the distributing robot classifies the workpieces transferred in a single row by the conveyor into two groups of workpieces, and moves only the workpieces belonging to one of the two groups to rearrange the workpieces into the two rows.

* * * * *